(12) United States Patent
Ghodsi

(10) Patent No.: US 9,696,937 B2
(45) Date of Patent: Jul. 4, 2017

(54) MEMORY SYSTEM DATA MANAGEMENT

(71) Applicant: Micron Technology, Inc., Boise, ID (US)

(72) Inventor: Ramin Ghodsi, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 14/940,248

(22) Filed: Nov. 13, 2015

(65) Prior Publication Data
US 2016/0070508 A1 Mar. 10, 2016

Related U.S. Application Data

(63) Continuation of application No. 14/068,574, filed on Oct. 31, 2013, now Pat. No. 9,218,282.

(51) Int. Cl.
*G06F 3/06* (2006.01)
*G06F 12/08* (2016.01)
*G06F 12/02* (2006.01)
*G06F 12/0802* (2016.01)
*G06F 12/0804* (2016.01)

(52) U.S. Cl.
CPC .......... *G06F 3/0647* (2013.01); *G06F 3/0604* (2013.01); *G06F 3/0619* (2013.01); *G06F 3/0679* (2013.01); *G06F 12/0246* (2013.01); *G06F 12/0802* (2013.01); *G06F 12/0284* (2013.01); *G06F 12/0804* (2013.01); *G06F 2212/1016* (2013.01); *G06F 2212/1032* (2013.01); *G06F 2212/2022* (2013.01); *G06F 2212/60* (2013.01); *G06F 2212/7201* (2013.01); *G06F 2212/7203* (2013.01)

(58) Field of Classification Search
CPC ......... G06F 12/0246; G06F 2212/7205; G06F 2212/7203; G06F 11/1068; G06F 12/0831; G06F 13/28
USPC ........................................................ 714/763
See application file for complete search history.

(56) References Cited

U.S. PATENT DOCUMENTS

| | | | |
|---|---|---|---|
| 5,579,502 A * | 11/1996 | Konishi | G06F 11/141 235/492 |
| 5,754,567 A | 5/1998 | Norman | |
| 6,266,792 B1 | 7/2001 | Wada et al. | |
| 7,200,693 B2 | 4/2007 | Jeddeloh | |
| 7,293,208 B2 | 11/2007 | Hobara | |
| 7,315,917 B2 * | 1/2008 | Bennett | G06F 12/0246 711/100 |
| 7,882,299 B2 | 2/2011 | Conley et al. | |
| 7,889,544 B2 * | 2/2011 | Chow | G06F 12/0804 365/148 |
| 8,244,960 B2 | 8/2012 | Paley et al. | |
| 8,312,204 B2 | 11/2012 | Zhang et al. | |
| 8,356,134 B2 | 1/2013 | Ito et al. | |

(Continued)

*Primary Examiner* — James C Kerveros
(74) *Attorney, Agent, or Firm* — Brooks, Cameron & Huebsch, PLLC

(57) ABSTRACT

The present disclosure includes apparatuses and methods for memory system data management. A number of embodiments include writing data from a host to a buffer in the memory system, receiving, at the buffer, a notification from a memory device in the memory system that the memory device is ready to receive data, sending at least a portion of the data from the buffer to the memory device, and writing the portion of the data to the memory device.

20 Claims, 4 Drawing Sheets

(56) References Cited

U.S. PATENT DOCUMENTS

| | | |
|---|---|---|
| 8,397,107 B1 | 3/2013 | Syu et al. |
| 8,448,034 B2 | 5/2013 | Asano et al. |
| 8,560,770 B2 | 10/2013 | Haines et al. |
| 8,581,919 B2 | 11/2013 | Park et al. |
| 8,667,365 B2 | 3/2014 | Jo et al. |
| 8,788,900 B2 * | 7/2014 | Asano ................ G06F 11/1068 714/747 |
| 8,799,747 B2 | 8/2014 | Goss et al. |
| 8,972,653 B2 | 3/2015 | Lin |
| 2007/0255891 A1 * | 11/2007 | Chow ................ G06F 12/0804 711/103 |

* cited by examiner

MEMORY SYSTEM DATA MANAGEMENT

PRIORITY INFORMATION

This application is a Continuation of U.S. application Ser. No. 14/068,574 filed Oct. 31, 2013, the specification of which are incorporated herein by reference.

TECHNICAL FIELD

The present disclosure relates generally to semiconductor memory and methods, and more particularly, to memory system data management.

BACKGROUND

Memory devices are typically provided as internal, semiconductor, integrated circuits and/or external removable devices in computers or other electronic devices. There are many different types of memory including volatile and non-volatile memory. Volatile memory can require power to maintain its data and can include random-access memory (RAM), dynamic random access memory (DRAM), and synchronous dynamic random access memory (SDRAM), among others. Non-volatile memory can retain stored data when not powered and can include NAND flash memory, NOR flash memory, phase change random access memory (PCRAM), resistive random access memory (RRAM), spin torque transfer random access memory (STTRAM) and magnetic random access memory (MRAM), among others.

Memory devices can be combined together to form memory systems, such as a solid state drive (SSD) or a rack of memory cards, for example, that include memory devices. Memory systems, such as an SSD or rack of memory cards, can include non-volatile memory (e.g., NAND flash memory and/or NOR flash memory), and/or can include volatile memory (e.g., DRAM and/or SRAM), among various other types of non-volatile and volatile memory. Flash memory devices can include memory cells storing data in a charge storage structure such as a floating gate, for instance, and may be utilized as non-volatile memory for a wide range of electronic applications. Flash memory devices typically use a one-transistor memory cell that allows for high memory densities, high reliability, and low power consumption.

Memory systems can be used to replace hard disk drives as the main storage device for a computing system, as the solid state drive can have advantages over hard drives in terms of performance, size, weight, ruggedness, operating temperature range, and power consumption. For example, memory systems can have superior performance when compared to magnetic disk drives due to their lack of moving parts, which may avoid seek time, latency, and other electro-mechanical delays associated with magnetic disk drives. Memory system manufacturers can use non-volatile flash memory to create flash memory systems that may not use an internal battery supply, thus allowing the drive to be more versatile and compact.

A memory system can include a number of memory devices, e.g., a number of memory chips. As one of ordinary skill in the art will appreciate, a memory chip can include a number of dies and/or logical units (LUNs), e.g., where a LUN can be one or more die. Each die can include a number of memory arrays and peripheral circuitry thereon. The memory arrays can include a number of memory cells organized into a number of physical pages, and the physical pages can be organized into a number of blocks. An array of flash memory cells can be programmed a page at a time and erased a block at a time. Operations, such as read, write, and erase operations, performed on a memory system can be limited by the amount resources available in the memory system to manage operations by the memory devices in the memory system.

DETAILED DESCRIPTION

Figure 1:
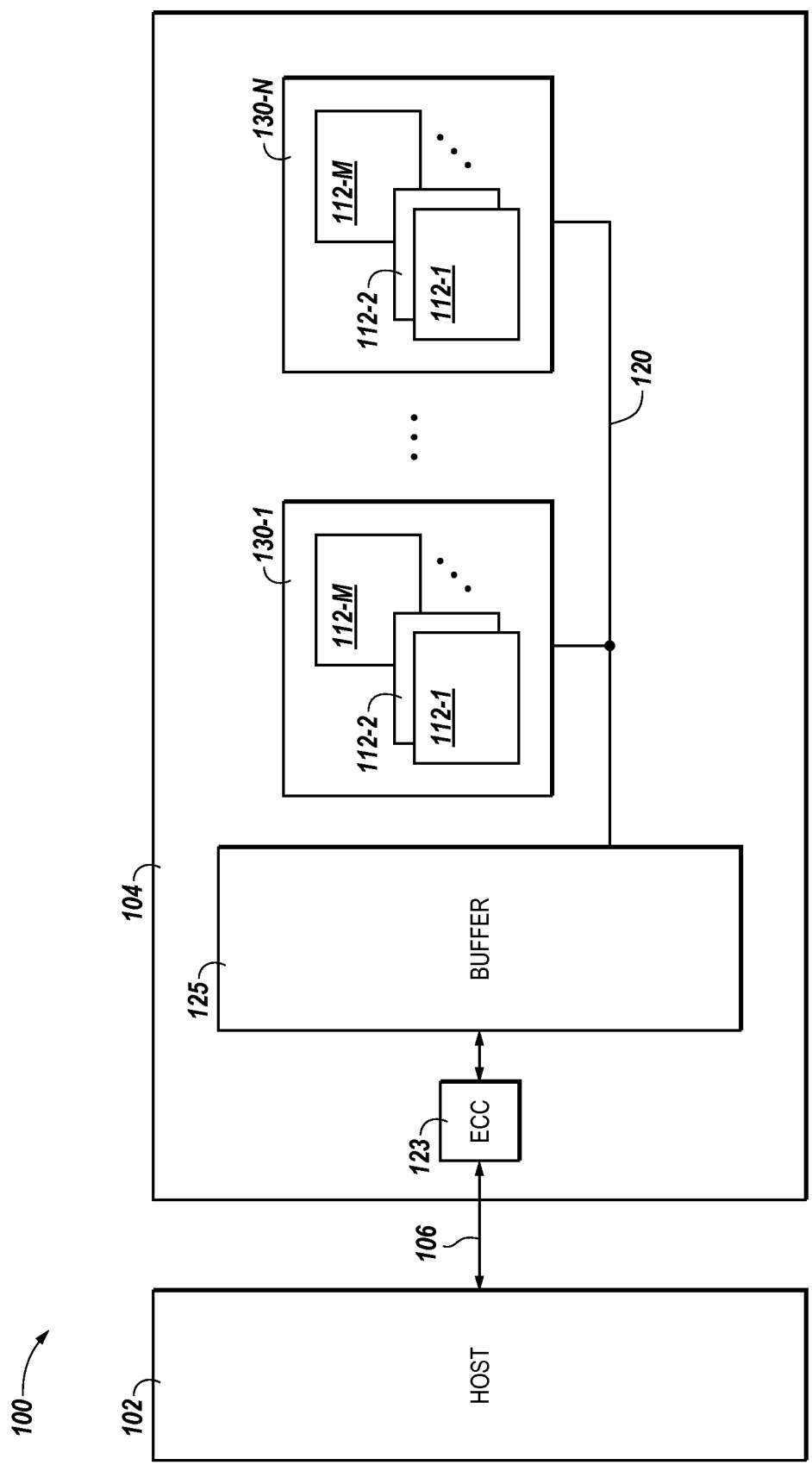
FIG. 1 is a block diagram of an apparatus in the form of a computing system including a memory system in accordance with a number of embodiments of the present disclosure.

The present disclosure includes apparatuses and methods for managing data in a memory system. A number of embodiments include writing data from a host to a buffer in the memory system, receiving, at the buffer, a notification from a memory device in the memory system that the memory device is ready to receive data, sending at least a portion of the data from the buffer to the memory device, and writing the portion of the data to the memory device.

Managing data in a memory system can include writing all data received from a host to a buffer in the memory system and managing where and when the data will be stored in the memory system via the buffer and a number of memory devices in the memory system. The number of memory devices can pull data from the buffer and write the data to the number of memory devices. The number of memory devices can pull data from the buffer when the number of memory devices are ready to receive data. The number of memory devices know their own ready/busy status, power usage status, and/or reliability information, among other information, so each of the number of memory devices can indicate to the buffer when they are ready to receive data and write data to their memory arrays. Data management in the memory system can be controlled via the buffer and the number of locally intelligent memory devices. The buffer and each of the number of memory devices can communicate with each other to manage where data will be stored in the memory system and when data will be written to the number memory devices for storage in the memory system.

In contrast, previous approaches used a controller on the memory system to manage where and when the data was written to each of the number of memory devices in the memory system. Accordingly, such previous approaches may negatively affect the performance of the memory system because a memory system was limited by the resources available in the controller to manage data and adding more memory to a memory system increased the burden on the controller. For example, determining where and when data was written to each of the number of memory devices can be time consuming and/or use a significant amount of power.

As used herein, "a number of" something can refer to one or more such things. For example, a number of memory cells can refer to one or more memory cells. Additionally, the designators "M" and "N", as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. For example, 125 may reference element "25" in FIG. 1, and a similar element may be referenced as 325 in FIG. 3.

FIG. 1 is a block diagram of an apparatus in the form of a computing system 100 including a memory system 104 in accordance with a number of embodiments of the present disclosure. As used herein, a memory system 104, a buffer 125, or a memory device 130-1, . . . , 130-N might also be separately considered an "apparatus". The memory system 104 can be any of a number of memory systems, such as a number of solid state drives (SSDs) and/or memory cards, and can include a host interface 106, a buffer 125, and a plurality memory devices 130-1, . . . , 130-N (e.g., solid state memory devices such as NAND flash devices) which provide storage volumes for the memory system 104. The memory system 104 can be communicatively coupled to a host 102 via a host interface 106, such as a backplane or bus.

Examples of hosts 102 can include laptop computers, personal computers, digital cameras, digital recording and playback devices, mobile telephones, PDAs, memory card readers, and interface hubs, among other host systems. The memory system 104 can be part of a cloud storage networking infrastructure, for example, that is coupled to host 102 via host interface 106, which can include a serial advanced technology attachment (SATA), peripheral component interconnect express (PCIe), a universal serial bus (USB), a fiber channel, a or an Ethernet connection, among other connectors and interfaces. In general, however, host interface 106 can provide an interface for passing control, address, data, and other signals between the memory system 104 and the host 102.

Host 102 can include a number of processors (e.g., parallel processors, co-processors, etc.) communicatively coupled to a memory and bus control. The number of processors can be a number of microprocessors, or some other type of controlling circuitry, such as a number of application-specific integrated circuits (ASICs), for example. Other components of the computing system 100 may also have processors. The memory and bus control can have memory and other components directly communicatively coupled thereto, for example, dynamic random access memory (DRAM), graphic user interface, and/or other user interface (e.g., display monitor, keyboard, mouse, etc.).

The memory system 104 includes a buffer 125 that receives data from the host 102. All the data that is received by the memory system 104 from the host 102 is written to memory cells in the buffer 125. The data received by the memory system 104 is written to memory cells in the buffer 125 to create a virtual pool of data, e.g., data that is not accessible by a host via a read operation, in the buffer. The buffer 125 and the memory devices 130-1, . . . , 130-N can control write operations that move the data from the virtual pool of data to the memory devices 130-1, . . . , 130-N, where the data can be accessed by a host. In a number of embodiments, the buffer can be a virtual buffer that is distributed among the number of memory devices 130-1, . . . , 130-N in the memory system 104. The data can have an error correction code (ECC) operation performed on the data by the ECC module 123 prior to being stored in the buffer 125. The buffer 125 can include volatile memory cells, such as DRAM memory cells, for example, and/or non-volatile memory, such as Flash, RRAM, MRAM, STTRAM, and/or PCRAM memory cells, for example. The buffer 125 can also include hardware, firmware, and/or software, e.g., write module 354 in FIG. 3, for managing data in the memory system 104. The data received from the host 102 can be written to the buffer 125 in increments that are the same size as the data written during a write operation on the number of memory devices 130-1, . . . , 130-N. Therefore, data associated with a data address in the buffer 125 can be written to the number of memory devices 130-1, . . . , 130-N in a single write operation and be associated with a data address in the number of memory devices 130-1, . . . , 130-N.

The memory system 104 includes a bus 120 to send/receive various signals (e.g., data signals, control signals, and/or address signals), between the memory devices 130-1, . . . , 130-N and the buffer 125. Although the example illustrated in FIG. 1 includes a single bus 120, the memory system 104 can include a separate data bus (DQ bus), control bus, and address bus, in some embodiments. The bus 120 is shared by the plurality of memory devices 130-1, . . . , 130-N and can have various types of bus structures including, but not limited to, bus structures related to Open NAND Flash Interface (ONFI), Compact Flash Interface, Multimedia Card (MMC), Secure Digital (SD), CE-ATA, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI). The bus 120 can be a hardwired shared physical bus, for instance.

The memory system 104 can be used in addition to, or in lieu of, a hard disk drive (HDD) in a number of different computing systems. The computing system 100 illustrated in FIG. 1 is one example of such a system; however, embodiments of the present disclosure are not limited to the configuration shown in FIG. 1.

As illustrated in FIG. 1, the memory devices 130-1, . . . , 130-N can comprise a number of dies and/or chips that can include a number of memory arrays 112-1, 112-2, . . . , 112-M providing a storage volume for the memory system 104. The memory arrays 112-1, 112-2, . . . , 112-M can include peripheral circuitry thereon. In a number of embodiments, the memory arrays 112-1, 112-2, . . . , 112-M can be the minimum component of memory system 104 capable of independently executing commands from and/or sending status to the buffer 125 and/or host 102 via bus 120. The memory arrays 112-1, 112-2, . . . , 112-M can include Flash memory arrays having a NAND architecture, for example. However, embodiments are not limited to a particular type of memory array or array architecture and could include memory arrays having RRAM, MRAM, STTRAM, and/or PCRAM memory cells.

In a number of embodiments, each of the number of memory devices 130-1, . . . , 130-N can determine when they are ready, e.g., not performing an operation, to receive and write data to memory arrays 112-1, 112-2, . . . , 112-M. Each of the number of memory device 130-1, . . . , 130-N can, independently, send notifications, via bus 120, to the buffer 125 that indicate when each respective memory device memory device 130-1, . . . , 130-N is ready to receive and write data to the memory arrays 112-1, 112-2, . . . , 112-M of a respective memory device 130-1, . . . , 130-N. The notifications can include an indication of the memory device's ready status and also a next available address in the memory arrays 112-1, 112-2, . . ., 112-M of the memory device where the memory device will write data to next. The memory devices 130-1, . . . , 130-N can send notifications, such that the timing of the notifications and the next available address included in the notifications can reduce wear on particular memory devices, provide approximately uniform use among the memory devices 130-1, . . . , 130-N, and/or allow the memory device's 130-1, . . . , 130-N to perform wear leveling operations.

The buffer 125 can receive notifications from the memory devices 130-1, . . . , 130-N that indicate which of the number of memory devices 130-1, . . . , 130-N are ready to receive data from the buffer 125. The buffer 125 can allocate portions of data to the memory devices 130-1, . . . , 130-N in the order in which the notifications are received by the buffer 125. Also, the buffer 125 can allocate portions of data to the memory devices 130-1, . . . , 130-N based on reducing wear on particular memory devices, concentrating wear on particular memory devices, and/or providing approximately uniform use among the memory devices 130-1, . . . , 130-N, among other wear strategies.

Figure 3:
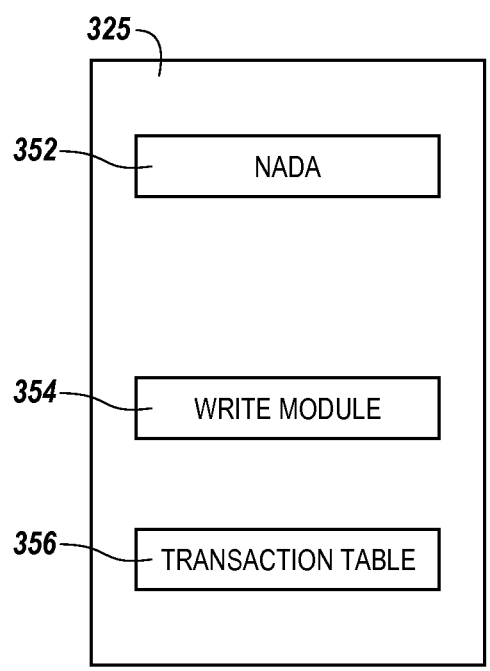
FIG. 3 illustrates a block diagram of an apparatus in the form of a buffer in accordance with a number of embodiments of the present disclosure.

In a number of embodiments, the buffer 125 can record and store a logical address and a physical address in a transaction table, e.g. transaction table 356 in FIG. 3, for each portion of data that is sent to the memory devices 130-1, . . . , 130-N. The transaction table in the buffer 125 can be stored in a particular location in the buffer 125. The information in the transaction table can be used by the memory system during a read operation. The data requested in a read request from the host 102 can be located using the information in the transaction table and retrieved from the memory devices 130-1, . . . , 130-N. The read operation can be performed by transferring the requested data directly from the memory devices 130-1, . . . , 130-N to the host using the information from the transaction table. The read operation can also be performed by retrieving the requested data from the memory devices 130-1, . . . , 130-N using the information in the transaction table, writing the requested data to a read buffer in buffer 125, and sending the requested data to the host 102 from the read buffer in buffer 125.

The embodiment illustrated in FIG. 1 can include additional circuitry, logic, and/or components not illustrated so as not to obscure embodiments of the present disclosure. For example, memory devices 130-1, . . . , 130-N can include address circuitry to latch address signals provided over I/O connectors through I/O circuitry. Signals can be received and decoded by a row decoder and a column decoder, to access memory system 102.

Figure 2:
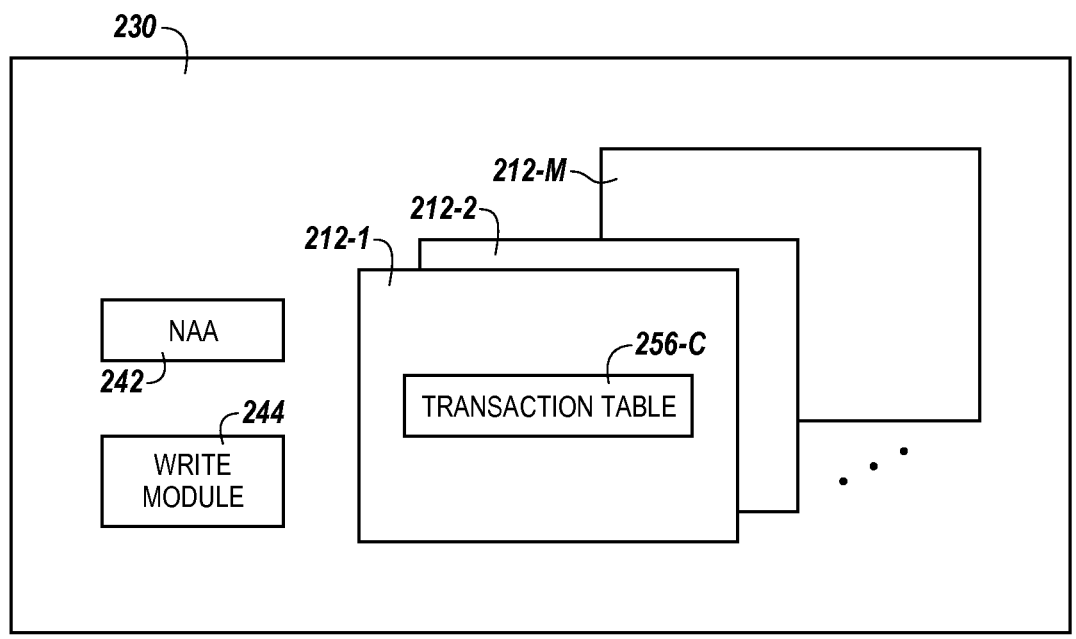
FIG. 2 illustrates a block diagram of an apparatus in the form of a memory device in accordance with a number of embodiments of the present disclosure.

FIG. 2 illustrates a block diagram of an apparatus in the form of a memory device 230 in accordance with a number of embodiments of the present disclosure. The memory device 230 includes a number of memory arrays 212-1, . . . 212-M. Each of the number of memory of memory arrays 212-1, . . . 212-M can include memory cells to store data. The memory device 230 can also include a write module 244. The write module 244 can include hardware, firmware, and/or software used to manage data in the memory device 230 and in a memory system that includes the memory device 230.

In a number of embodiments, the memory device 230 includes a next available address (NAA) entry 242 that indicates a location in the memory arrays 212-1, . . . 212-M that is ready to receive the next portion of data that is sent to the memory device 230. The NAA entry 242 can include a physical address of the location in the memory arrays 212-1, . . . 212-M that is ready to receive the next portion of data sent to the memory device 230. The NAA entry 242 can be determined by the write module 244. The write module 244 can determine the NAA entry based on wear, e.g. a wear strategy used by the memory device, on the memory device 230, such memory cells storing static data, dynamic data, or no data and/or wear leveling operations that the memory device can perform to enhance performance of the memory device 230 The NAA entry 242 can be part of the notification sent to the buffer from the memory device 230 indicating that the memory device is ready to receive data from the buffer. The NAA entry 242 that is part of the notification sent to the buffer includes the physical address of the NAA, so that the buffer will know where the data it sends to the memory device 230 will be located in the memory arrays 212-1, . . . 212-M of the memory device 230. The physical address of the data sent to memory device 230 by the buffer can be stored in a transaction table in the buffer.

The memory device 230 includes a copy of the transaction table 256-C. The copy of the transaction table 256-C can be stored in the memory arrays 212-1, . . . 212-M of the memory device 230, as illustrated in FIG. 2, in memory dedicated for storing the copy of the transaction table 256-C, and/or across multiple memory devices in a memory system. The copy of the transaction table 256-C is a copy of the transaction table in the buffer, e.g. transaction table 356 described in association with FIG. 3. The copy of the transaction table 256-C is stored in the memory device 230 on a periodic basis, such as once a minute, for example. The copy of the transaction table 256-C can be stored in the memory device 230, so that the information in the transaction table stored in the buffer, such as buffer 125 in FIG. 1, is not lost when the memory system is not receiving power. The copy of the transaction table 256-C includes logical and physical address information for each write operation that has occurred in the memory system.

FIG. 3 illustrates a block diagram of an apparatus in the form of a buffer 325 in accordance with a number of embodiments of the present disclosure. The buffer 325 includes a number of memory cells used to store data received from a host. The buffer 325 can include volatile memory cells, such as DRAM memory cells, and/or non-volatile memory cells, such as Flash, RRAM, MRAM, STTRAM, and/or PCRAM memory cells, to store the data received from a host. The size, e.g., storage capacity, of the buffer 325 can be selected to suit a specification application of the memory system that includes the buffer 325. The size of the buffer 325 can be selected based on performance, cost, and/or size of the memory system, among other factors. The buffer 325 can also include a write module 354. The write module 354 can include hardware, firmware, and/or software used to manage data in the buffer 325 and in a memory system that includes the buffer 325.

In a number of embodiments, the buffer 325 includes a next available data address (NADA) entry 352 that indicates where in the buffer 325 the next portion of data that will be sent to a memory device is located. The NADA entry 352 can include a physical address, in the buffer, of the next portion of data that will be sent to a memory device. The NADA entry 352 can be matched with a next available address (NAA) entry that is part of a notification received by the buffer from a memory device. The NAA entry indicates the physical location where the next portion of data from the buffer will be written in a memory device. The NADA entry and the NAA entry are matched so that the next portion of data that will be sent to the memory device can be located in the buffer and also so that a logical address of the next portion of data and a physical address of where the next portion of data will be located in a memory device can be stored in transaction table 356. The transaction table 356 can be stored in the buffer 325 and updated after every transaction that takes place in the memory system. The information in the transaction table 356 can be copied periodically to a number of memory devices in a memory system, so there is a back-up of the transaction action information. The copy of the transaction table, e.g. copy of transaction table 256-C, can be used by the memory system to populate the transaction table 356 upon power-up of the memory system.

Figure 4A:
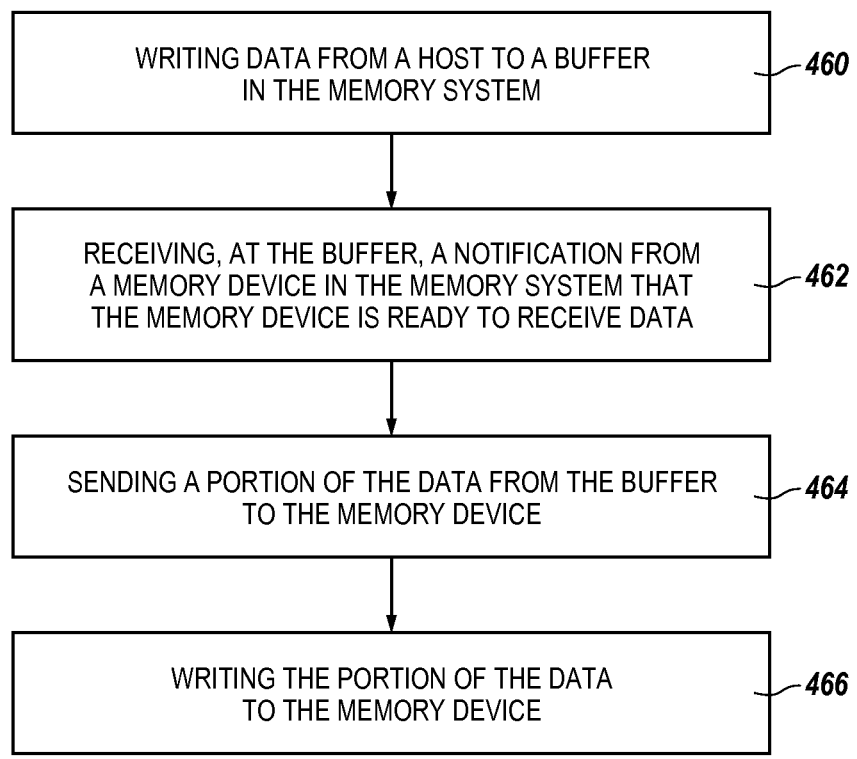
FIGS. 4A and 4B illustrate examples of a method for managing data in a memory system in accordance with a number of embodiments of the present disclosure.

FIG. 4A illustrates an example of a method for managing data in a memory system in accordance with a number of embodiments of the present disclosure. The method can be performed by a buffer and a number of memory devices such as, for example, buffer 125 and memory devices 130-1, . . . , 130-N previously described in connection with FIG. 1. The method can include data management by a buffer and memory devices to control when and where data is stored in the memory devices of a memory system.

At block 460, the method includes writing data from a host to a buffer in the memory system. In the method, all data received by the buffer from a host is stored in the memory cells of the buffer. The buffer can record logical addresses for each portion of data received from the host along with a data address indicating where each portion of data is stored in the buffer.

At block 462, the method includes receiving, at the buffer, a notification from a memory device in the memory system that in the memory device is ready to receive data. The notification can be sent from the memory device to the buffer and can include a next available address (NAA) indicating where the memory device will write the data during the next write operation performed by the memory device. The notification sent from the memory device to the buffer can also include an indication of the ready status of the memory device, wherein the ready status can indicate the memory device is not performing an operation and is ready to receive data for storage in the memory device.

At block 464, the method includes sending a portion of data from the buffer to the memory device. Once the buffer receives a notification from a memory device, the buffer can send a portion of data to the memory device. The portion of data can be data that is located at a next available data address (NADA), which is determined by the buffer. The NADA indicates where the portion of data that will be sent to the memory device is located and the buffer uses the NADA to locate the portion of data in the memory cells of the buffer and send the portion of data to the memory device.

At block 466, the method includes writing the portion of data to the memory device. Once the memory device receives a portion of data from the buffer, the memory device can perform a write operation to write the portion of data to the NAA in the memory device.

Figure 4B:
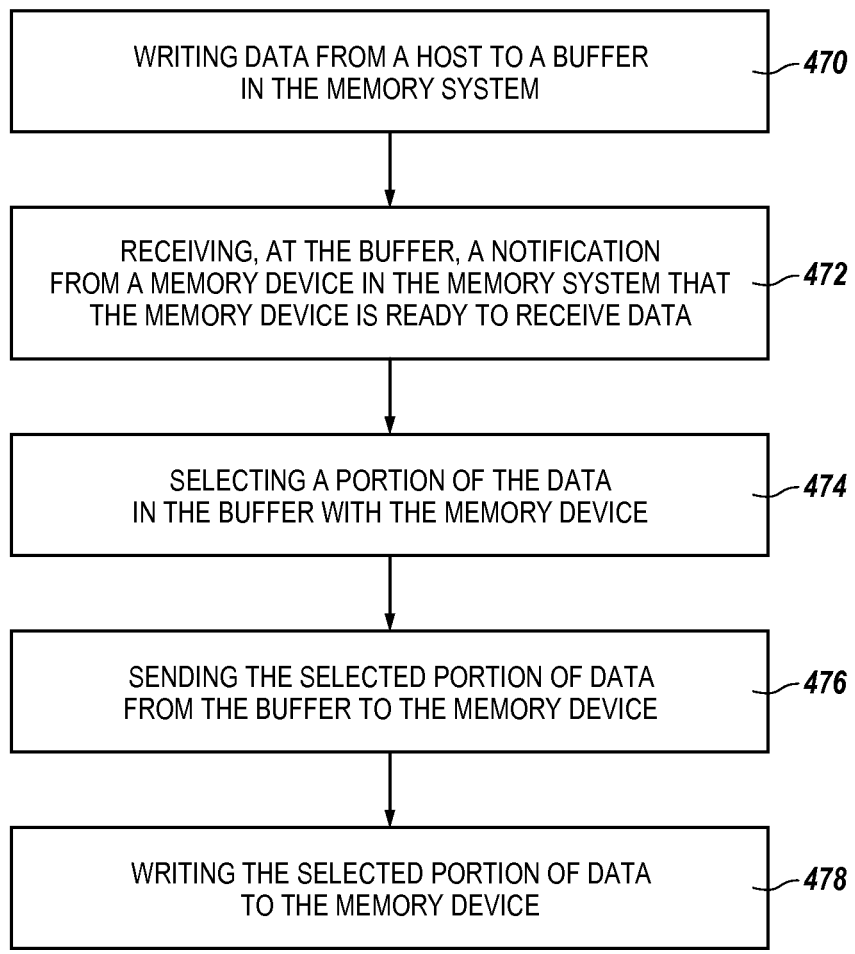

FIG. 4B illustrates an example of a method for managing data in a memory system in accordance with a number of embodiments of the present disclosure. The method can be performed by a buffer and a number of memory devices such as, for example, buffer 125 and memory devices 130-1, . . . , 130-N previously described in connection with FIG. 1. The method can include data management by a buffer and memory devices to control when and where data is stored in the memory devices of a memory system.

At block 470, the method includes writing data from a host to a buffer in the memory system. In the method, all data received by the buffer from a host is stored in the memory cells of the buffer. The buffer can record logical addresses for each portion of data received from the host along with a data address indicating where each portion of data is stored in the buffer.

At block 472, the method includes receiving, at the buffer, a notification from a memory device in the memory system that in the memory device is ready to receive data. The notification can be sent from the memory device to the buffer and can include a next available address (NAA) indicating where the memory device will write the data during the next write operation performed by the memory device. The notification sent from the memory device to the buffer can also include an indication of the ready status of the memory device, wherein the ready status can indicate the memory device is not performing an operation and is ready to receive data for storage in the memory device.

At block 474, the method includes selecting a portion the data in the buffer with the memory device. The memory device can select the portion of the data and notify the buffer that the selected portion of data is the next available data address (NADA) in the buffer.

At block 476, the method includes sending the selected portion of data from the buffer to the memory device. Once the buffer receives a notification from a memory device, the buffer can send a portion of data to the memory device. The selected portion of data can be data that is located at a next available data address (NADA), which is determined by the memory device. The NADA indicates where the portion of data that will be sent to the memory device is located and the buffer uses the NADA to locate the portion of data in the memory cells of the buffer and send the portion of data to the memory device.

At block 478, the method includes writing the selected portion of data to the memory device. Once the memory device receives a portion of data from the buffer, the memory device can perform a write operation to write the portion of data to the NAA in the memory device.

In a number of embodiments, a read operation can be performed by a computing system where the data requested in a read request from a host can be located using information in a transaction table. The read operation can be performed by transferring the requested data directly from a memory device to the host using the information from the transaction table. The read operation can also be performed by retrieving the requested data from a memory device using the information in the transaction table, writing the requested data to a read buffer, and sending the requested data to the host from the read buffer.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of ordinary skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for managing data in a memory system, comprising:
    generating a notification with a memory device that indicates the memory device is ready to receive data from a buffer;
    sending the notification from the memory device to the buffer; and
    writing a number of portions of data to the memory device in the memory system in response to receiving the notification, wherein the buffer allocates data from the buffer to the memory device in response to receiving the notification and wherein the number of portions of data are sent from the buffer to the memory device in response to receiving the notification.

2. The method of claim 1, wherein sending the notification from the memory device to the buffer includes sending a next available address in the memory device.

3. The method of claim 2, wherein the method includes determining the next available address in the memory device based on a location in the memory device that is ready to receive data and on a wear strategy implemented on the memory device.

4. The method of claim 1, wherein the method includes sending data from a next available data address in the buffer.

5. The method of claim 1, wherein the method includes recording, in a transaction table, a logical address and a physical address of each of the number of portions of data written to the memory device.

6. The method of claim 5, wherein the method includes storing the transaction table in the buffer.

7. The method of claim 5, wherein the method includes storing the transaction table in the memory device.

8. The method of claim 1, wherein the method includes performing an error correction (ECC) operation on the data prior to writing the data to the buffer.

9. A method for managing data in a memory system, comprising:
    writing data from a host to a buffer in the memory system; and
    writing a number of portions of the data to a number of memory devices in the memory system in response to the buffer receiving a number of notifications sent from the number of memory devices that indicate that the memory devices are ready to receive and write data and wherein the number of portions of data are sent from the buffer to the number of memory devices in response to receiving the number of notifications.

10. The method of claim 9, wherein writing the number of portions of the data in the buffer to the number of memory devices includes writing the number of portions of data to the number of memory devices in an order in which the number of notifications from the number of memory devices are received by the buffer.

11. The method of claim 9, wherein the method includes performing wear operations on at least one of the number of memory devices.

12. The method of claim 9, wherein the method includes performing an error correction (ECC) operation on the data prior to writing the data to the buffer.

13. The method of claim 9, wherein writing data from the host to the buffer includes writing data to the buffer in increments that are the size of a NAND page.

14. The method of claim 9, wherein writing the number of portions of the data in the buffer to the number of memory devices includes writing the number of portions of data in NAND page increments.

15. An apparatus, comprising:
    a number of memory devices; and
    a buffer coupled to the number of memory devices and configured to:
        receive data from a host and write the data in the buffer;
        allocate at least a portion of the data from the buffer to one of the number of memory devices in response to receiving a notification from the one of the number of memory devices that the one of the number of memory devices is ready to receive data; and
        send the portion of the data from the buffer to the one of the number of memory devices in response to the portion of the data being allocated to the one of the number of memory devices.

16. The apparatus of claim 15, wherein the one of the number of memory devices is configured to send another notification to the buffer that includes another next available address to write data when the one of the number of memory devices has completed all operations scheduled to be performed by the one of the number of memory devices.

17. The apparatus of claim 15, wherein the buffer includes a number of volatile memory cells.

18. The apparatus of claim 15, wherein the number of memory devices comprise a number of groups of non-volatile memory cells.

19. The apparatus of claim 15, wherein the buffer is configured to store a logical address and a physical address of the portion of data sent to the one of the number of memory devices in a transaction table.

20. The apparatus of claim 19, wherein a copy of the transaction table is periodically stored in the number of memory devices and the copy of the transaction table is sent to the buffer upon power up the apparatus.

* * * * *